US011770862B2

(12) United States Patent
Babu et al.

(10) Patent No.: US 11,770,862 B2
(45) Date of Patent: Sep. 26, 2023

(54) DETERMINING WHETHER TO DISPLAY AN INDICATOR OF MILLIMETER WAVE CELLULAR AVAILABILITY

(71) Applicant: Apple Inc., Cupertino, CA (US)

(72) Inventors: Shivani Suresh Babu, San Jose, CA (US); Arun G. Mathias, Los Altos, CA (US); Rajesh Ambati, Los Altos Hills, CA (US); Thanigaivelu Elangovan, Santa Clara, CA (US); Ajay Singh, Cupertino, CA (US); Raghuveer Mallikarjunan, Cupertino, CA (US); Rohan C. Malthankar, San Jose, CA (US); Vikram B. Yerrabommanahalli, Suunyvale, CA (US); Chandiramohan Vasudevan, San Jose, CA (US); Juergen H. Kreuchauf, San Francisco, CA (US); Harshit Chuttani, Campbell, CA (US); Punit H. Awatramani, Fremont, CA (US); Swapna V. Iyer, San Jose, CA (US); Lakshmi N. Kavuri, Cupertino, CA (US); Muthukumaran Dhanapal, Dublin, CA (US); Kanuganti Rajeswar Reddy, Cupertino, CA (US); Viswanath Nagarajan, San Jose, CA (US); Navjot Thakral, Santa Clara, CA (US)

(73) Assignee: Apple Inc., Cupertino, CA (US)

(*) Notice: Subject to any disclaimer, the term of this patent is extended or adjusted under 35 U.S.C. 154(b) by 297 days.

(21) Appl. No.: 17/362,096

(22) Filed: Jun. 29, 2021

(65) Prior Publication Data
US 2021/0410205 A1 Dec. 30, 2021

Related U.S. Application Data

(60) Provisional application No. 63/046,513, filed on Jun. 30, 2020.

(51) Int. Cl.
H04W 24/10 (2009.01)
H04W 76/10 (2018.01)
(Continued)

(52) U.S. Cl.
CPC ....... H04W 76/10 (2018.02); H04M 1/72454 (2021.01); H04W 24/10 (2013.01); H04W 76/38 (2018.02)

(58) Field of Classification Search
CPC ..... H04W 76/10; H04W 24/10; H04W 76/38; H04W 48/04; H04W 4/021; H04W 24/00; H04M 1/72454
See application file for complete search history.

(56) References Cited

U.S. PATENT DOCUMENTS 10,925,055 B2 2/2021 Wu
2019/0082333 A1* 3/2019 Malik .................... H04B 7/063
(Continued)

FOREIGN PATENT DOCUMENTS

EP 2170001 B1 3/2010
WO 2017183899 A2 10/2017

Primary Examiner — Chuong A Ngo
(74) Attorney, Agent, or Firm — Kowert, Hood, Munyon, Rankin & Goetzel, P.C.

(57) ABSTRACT

This disclosure relates to techniques for a wireless device to determine whether to display an indicator of millimeter wave cellular availability. A wireless device may establish a radio resource control connection that includes connectivity with a fifth generation new radio millimeter wave cell. The wireless device may determine to display an indication of millimeter wave cell availability. The wireless device may determine location status information and motion status information for the wireless device. The wireless device may determine when to cease displaying the indication of millimeter wave cell availability after the radio resource control connection is released or the millimeter wave cell is decon-
(Continued)

figured based at least in part on the location status information for the wireless device and the motion status information for the wireless device.

20 Claims, 6 Drawing Sheets

(51) Int. Cl.
*H04W 76/38* (2018.01)
*H04M 1/72454* (2021.01)

(56) References Cited

U.S. PATENT DOCUMENTS

| | | | |
|---|---|---|---|
| 2019/0268959 A1* | 8/2019 | Urushihara | G06F 13/00 |
| 2021/0160704 A1* | 5/2021 | Aksu | H04W 4/025 |
| 2021/0321415 A1* | 10/2021 | Raghavan | H04L 27/26025 |

* cited by examiner

DETERMINING WHETHER TO DISPLAY AN INDICATOR OF MILLIMETER WAVE CELLULAR AVAILABILITY

PRIORITY INFORMATION

This application claims priority to U.S. provisional patent application Ser. No. 63/046,513, entitled "Determining Whether to Display an Indicator of Millimeter Wave Cellular Availability," filed Jun. 30, 2020, which is hereby incorporated by reference in its entirety as though fully and completely set forth herein.

FIELD

The present application relates to wireless communications, and more particularly to systems, apparatuses, and methods for determining whether to display an indicator of millimeter wave cellular availability in a wireless device.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), NR, HSPA, 3GPP2 CDMA2000 (e.g., 1xRTT, 1xEV-DO, HRPD, eHRPD), IEEE 802.11 (WLAN or Wi-Fi), BLUETOOTH™, etc.

The ever increasing number of features and functionality introduced in wireless communication devices also creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications. In addition, increasing the functionality of a UE device can place a significant strain on the battery life of the UE device. Thus, it is important to reduce power requirements while allowing the UE device to maintain good transmit and receive abilities for improved communications.

Additionally, it may be the case that different wireless communication technologies, and/or different features that may be used within the scope of a single wireless communication technology, may provide different communication characteristics, e.g., with respect to amount of bandwidth available, latency, data cost, and/or any of various other possible characteristics. Such differences could impact user behavior, e.g., to the degree that the user is aware of such differences and which wireless communication technology/technologies and/or features are available. However, given the potential for rapid change in wireless conditions, it may be challenging to accurately determine and indicate such information. Accordingly, improvements in the field are desired.

SUMMARY

Embodiments are presented herein of apparatuses, systems, and methods for determining whether to display an indicator of millimeter wave cellular availability in a wireless device.

The techniques may include the use of motion and/or location information for the wireless device to increase the accuracy of the information provided to a user of the wireless device. For example, in some cases, a wireless device may establish a link with a millimeter wave cell, for example as a secondary cell in a standalone or non standalone fifth generation new radio cellular communication system, then later release the link with the millimeter wave cell while continuing to remain within the coverage area of that cell. In such a scenario, use of motion and/or location information to determine if the wireless device is likely to still be within the coverage area of a millimeter wave cell, or if the wireless device is likely to have left the coverage area of a millimeter wave cell, may result in the wireless device being able to accurately indicate when millimeter wave cellular communication capability is available to the wireless device even if no millimeter wave cellular link is currently active for the wireless device more often.

The motion status information used could include a motion state that is selected from multiple possible motion states based on motion sensing circuitry of the wireless device, as one possibility. Such information, possibly in conjunction with signal strength information for a millimeter wave cell that the wireless device was previously connected to, to determine how long to continue to display an indication of millimeter wave cellular availability after the connection with the millimeter wave cell is released.

The location status information used could include information determined based on anchor cell characteristics, as one possibility. For example, if the wireless device changes anchor cells after a connection with a millimeter wave cell is released (and does not establish a new link with a millimeter wave cell after changing anchor cells), the wireless device may determine to cease displaying an indication of millimeter wave cellular availability. As another example, if the anchor cell signal strength drops by a significant amount after a connection with a millimeter wave cell is released, the wireless device may determine to cease displaying an indication of millimeter wave cellular availability.

As another possible type of location status information that could be used in accordance with the techniques described herein, the wireless device may determine whether it has exited the geographical area of a millimeter wave cell after a connection with the millimeter wave cell is released, and determine to cease displaying an indication of millimeter wave cellular availability if the wireless device has exited the geographical area of the millimeter wave cell. The location of the wireless device may, for example, be determined using global navigational satellite system capability of the wireless device, and that location may be compared with information indicating geographical boundaries of the millimeter wave cell.

Note that the techniques described herein may be implemented in and/or used with a number of different types of devices, including but not limited to base stations, access points, cellular phones, portable media players, tablet computers, wearable devices, unmanned aerial vehicles, unmanned aerial controllers, automobiles and/or motorized vehicles, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
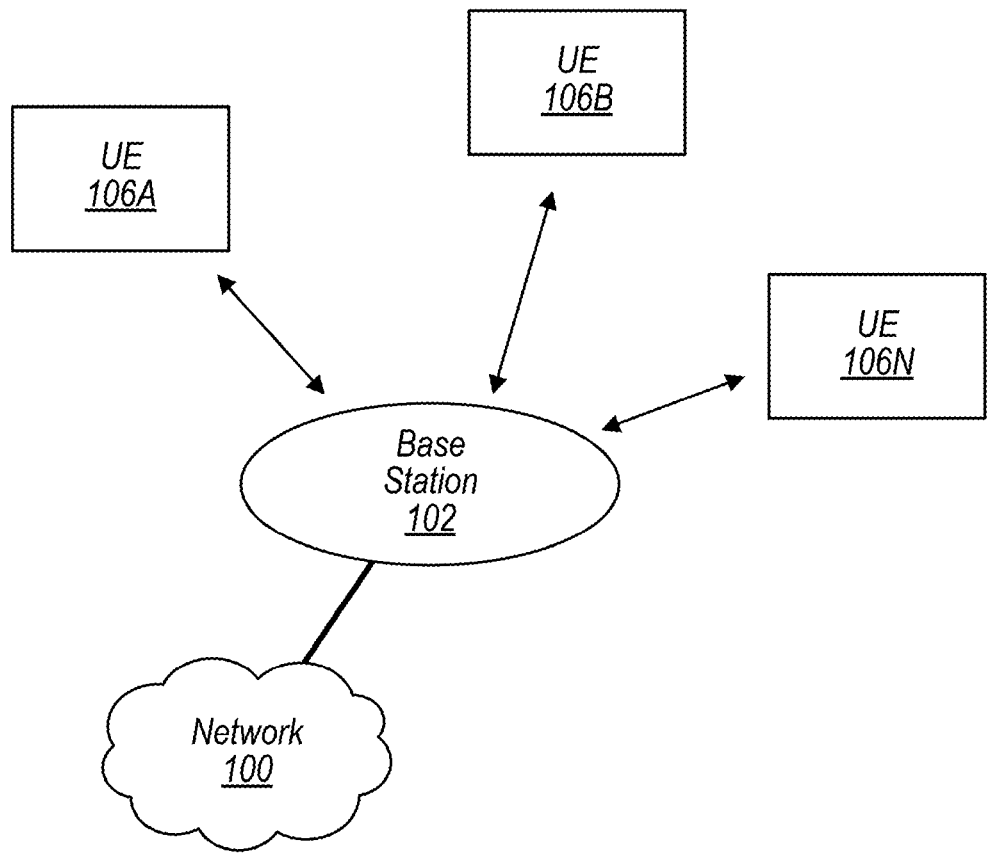
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

UE: User Equipment
RF: Radio Frequency
BS: Base Station
GSM: Global System for Mobile Communication
UMTS: Universal Mobile Telecommunication System
LTE: Long Term Evolution
NR: New Radio
mmW or mmWave: Millimeter Wave
RRC: Radio Resource Control
TX: Transmission/Transmit
RX: Reception/Receive
RAT: Radio Access Technology
TRP: Transmission-Reception-Point
SCG: Secondary Cell Group Terms The following is a glossary of terms that may appear in the present disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, other handheld devices, automobiles and/or motor vehicles, unmanned aerial vehicles (UAVs) (e.g., drones), UAV controllers (UACs), etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, e.g., in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
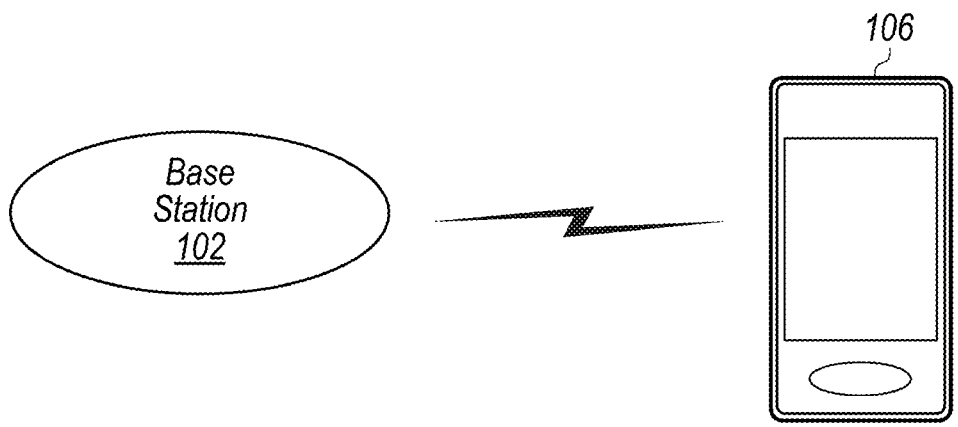
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G NR, 3GPP2 CDMA2000 (e.g., 1×RTT, 1×EV-DO, HRPD, eHRPD), Wi-Fi, etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless communication standards. For example, a UE 106 might be configured to communicate using either or both of a 3GPP cellular communication standard or a 3GPP2 cellular communication standard. In some embodiments, the UE 106 may be configured to predict and mitigate thermal pressure in a wireless device, such as according to the various methods described herein. The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H), etc. Other combinations of wireless communication standards (including more than two wireless communication standards) are also possible.

FIG. 2 illustrates an exemplary user equipment 106 (e.g., one of the devices 106A through 106N) in communication with the base station 102, according to some embodiments. The UE 106 may be a device with wireless network connectivity such as a mobile phone, a hand-held device, a wearable device, a computer or a tablet, an unmanned aerial vehicle (UAV), an unmanned aerial controller (UAC), an automobile, or virtually any type of wireless device. The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, 5G NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or CDMA2000 1×RTT (or LTE or NR, or LTE or GSM), and separate radios for communicating using each of Wi-Fi and BLUETOOTH™. Other configurations are also possible.

Figure 3:
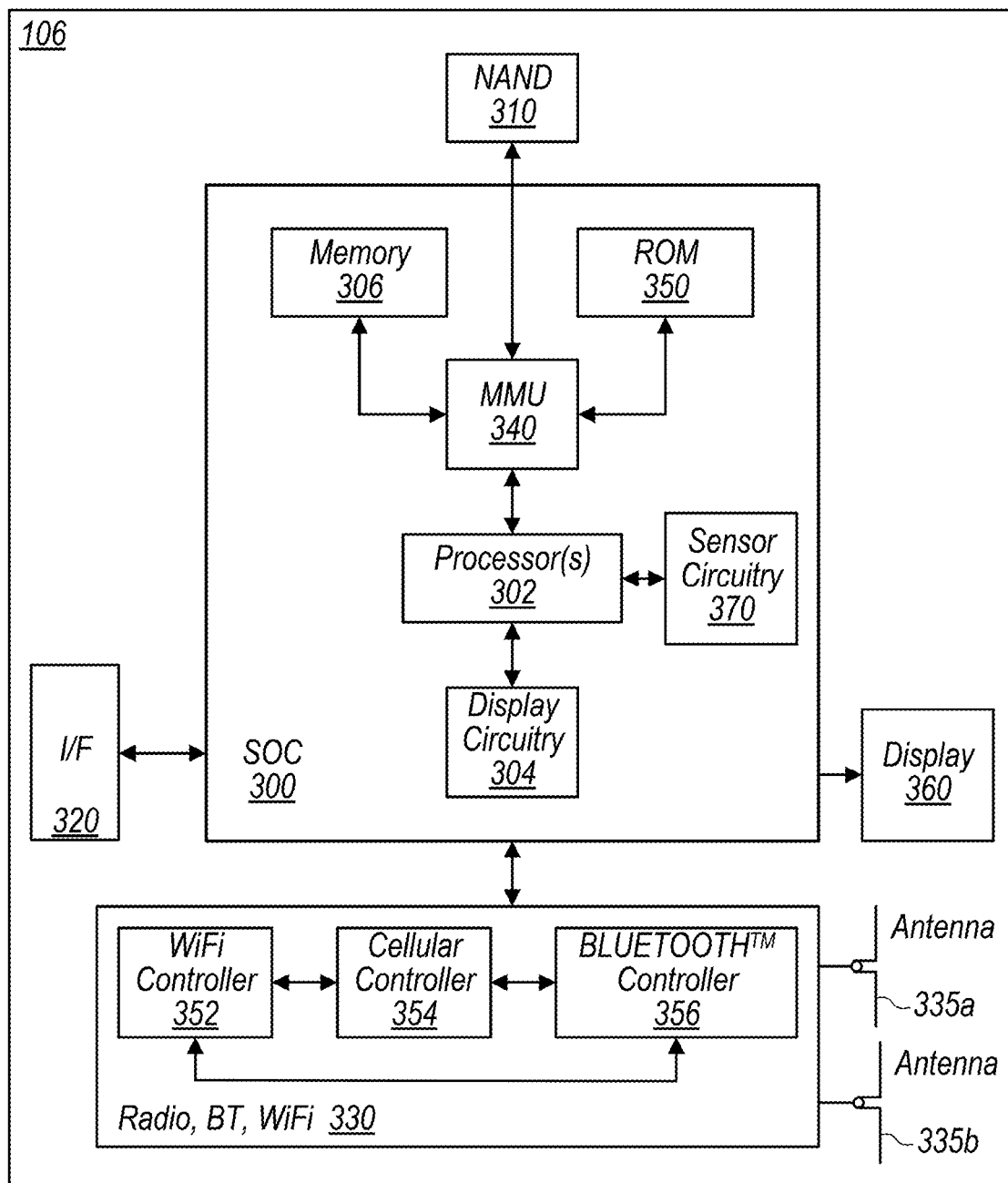
FIG. 3 illustrates an exemplary block diagram of a UE, according to some embodiments.

FIG. 3—Block Diagram of an Exemplary UE Device

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The SOC 300 may also include sensor circuitry 370, which may include components for sensing or measuring any of a variety of possible characteristics or parameters of the UE 106. For example, the sensor circuitry 370 may include motion sensing circuitry configured to detect motion of the UE 106, for example using a gyroscope, accelerometer, and/or any of various other motion sensing components. As another possibility, the sensor circuitry 370 may include one or more temperature sensing components, for example for measuring the temperature of each of one or more antenna panels and/or other components of the UE 106. Any of various other possible types of sensor circuitry may also or alternatively be included in UE 106, as desired. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, BLUETOOTH™, Wi-Fi, GPS, etc.). The UE device 106 may include at least one antenna (e.g. 335a), and possibly multiple antennas (e.g. illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. As noted above, the UE may be configured to communicate wirelessly using multiple wireless communication standards in some embodiments.

The UE 106 may include hardware and software components for implementing methods for the UE 106 to determine whether to display an indicator of millimeter wave cellular availability in a wireless device, such as described further subsequently herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to determine whether to display an indicator of millimeter wave cellular availability in a wireless device according to various embodiments disclosed herein. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 352, a cellular controller (e.g. LTE and/or LTE-A controller) 354, and BLUETOOTH™ controller 356, and in at least some embodiments, one or more or all of these controllers may be implemented as respective integrated circuits (ICs or chips, for short) in communication with each other and with SOC 300 (and more specifically with processor(s) 302). For example, Wi-Fi controller 352 may communicate with cellular controller 354 over a cell-ISM link or WCI interface, and/or BLUETOOTH™ controller 356 may communicate with cellular controller 354 over a cell-ISM link, etc. While three separate controllers are illustrated within radio 330, other embodiments have fewer or more similar controllers for various different RATs that may be implemented in UE device 106.

Further, embodiments in which controllers may implement functionality associated with multiple radio access technologies are also envisioned. For example, according to some embodiments, the cellular controller 354 may, in addition to hardware and/or software components for performing cellular communication, include hardware and/or software components for performing one or more activities associated with Wi-Fi, such as Wi-Fi preamble detection, and/or generation and transmission of Wi-Fi physical layer preamble signals.

Figure 4:
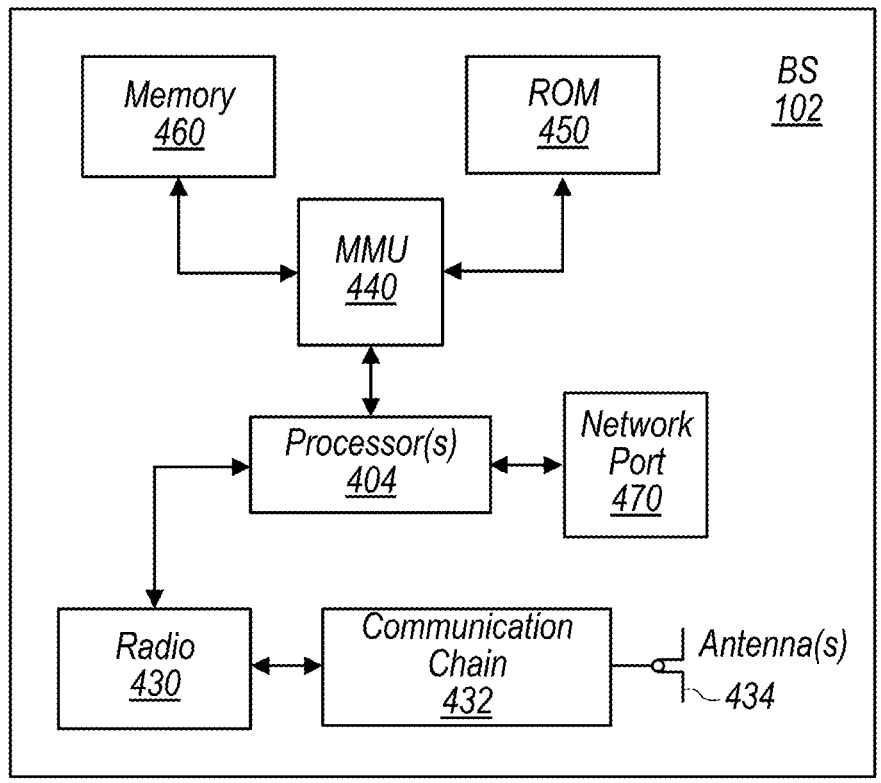
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, NR, LTE, LTE-A WCDMA, CDMA2000, etc.

The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g., it may include at least one Ethernet port, and radio 430 may be designed to communicate according to the Wi-Fi standard.

FIGS. 5-8—Determining When to Display a Millimeter Wave Cellular Availability Indicator Different wireless communication technologies can have significant variation in their features and performance. For example, at least in some instances, 3GPP 5G NR cellular communication technology may support communication with higher data rates than previous cellular communication technologies, albeit potentially at a higher power cost.

Figure 5:
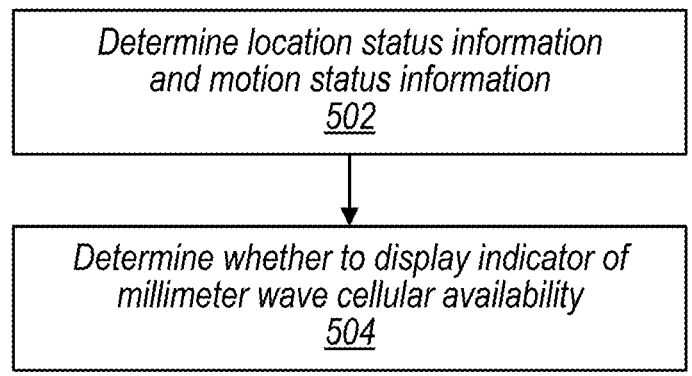
FIG. 5 is a flowchart diagram illustrating aspects of an exemplary possible method for determining whether to display an indicator of millimeter wave cellular availability in a wireless device, according to some embodiments.

Accordingly, FIG. 5 is a flowchart diagram illustrating such a method for determining whether to display an indicator of millimeter wave cellular availability in a wireless device, at least according to some embodiments. Aspects of the method of FIG. 5 may be implemented by a wireless device, e.g., in conjunction with one or more cellular base stations, such as a UE 106 and a BS 102 illustrated in and described with respect to various of the Figures herein, or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements.

Note that while at least some elements of the method of FIG. 5 are described in a manner relating to the use of communication techniques and/or features associated with 3GPP and/or NR specification documents, such description is not intended to be limiting to the disclosure, and aspects of the method of FIG. 5 may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method of FIG. 5 may operate as follows.

The wireless device may establish a wireless link with a cellular base station. Establishing the wireless link may include establishing a radio resource control (RRC) connection with a serving cellular base station, at least according to some embodiments. Establishing the RRC connection may include configuring various parameters for communication between the wireless device and the cellular base station, establishing context information for the wireless device, and/or any of various other possible features, e.g., relating to establishing an air interface for the wireless device to perform cellular communication with a cellular network associated with the cellular base station. After establishing the RRC connection, the wireless device may operate in a RRC connected state. In some instances, the RRC connection may also be released (e.g., after a certain period of inactivity with respect to data communication), in which case the wireless device may operate in a RRC idle state or a RRC inactive state. In some instances, the wireless device may perform handover (e.g., while in RRC connected mode) or cell re-selection (e.g., while in RRC idle or RRC inactive mode) to a new serving cell, e.g., due to wireless device mobility, changing wireless medium conditions, and/or for any of various other possible reasons.

At least in some instances, it may be possible for the RRC connection to include connectivity with a 5G NR millimeter wave (mmW) cell. For example, in a non-standalone 5G NR deployment, the wireless device may establish a wireless link with an anchor LTE cell, and may also establish a wireless link with a secondary cell group (SCG) that operates according to 5G NR, and that may include at least one mmW cell. As another example, in a standalone 5G NR deployment, the wireless device may establish a wireless link with an anchor 5G NR cell, and may also establish a wireless link with at least one 5G NR mmW secondary cell (SCell). Other configurations are also possible.

In 502, the wireless device may determine location status information and motion status information for the wireless device.

According to some embodiments, determining the motion status information may include receiving motion sensor information from motion sensing circuitry of the wireless device, and categorizing the wireless device into one of multiple possible motion states. The motion states could include a stationary state, a semi-stationary state, a moving state, a driving state, and/or any of various other possible states, which may be defined in any of various ways, as desired.

According to some embodiments, determining the location status information may include determining whether it is likely that the wireless device remains within the coverage area of the 5G NR mmW cell, e.g., for use in case the wireless device is no longer connected to the 5G NR mmW cell but may still remain within the coverage area of the 5G NR mmW cell. For example, as one possibility, the wireless device may determine whether an anchor cell ID for the wireless device changes, e.g., since if the anchor cell ID has changed, it may be an indicator that it is unlikely that the wireless device remains within the coverage area of the 5G NR mmW cell. As another example, the wireless device may determine when the anchor cell signal strength changes by more than a configured threshold from a time when the 5G NR mmW cell was deconfigured, e.g., since if the anchor cell signal strength has change by a significant amount, it may reflect a higher likelihood that the wireless device is no longer within the coverage area of the 5G NR mmW cell. As a still further example, the wireless device may determine when the wireless device exits a geographic area associated with the 5G NR mmW cell. For example, it may be possible that the wireless device can determine the cell centroid and perimeter locations for the 5G NR mmW cell (e.g., from aggregated information from multiple mmW capable devices), and can determine whether the wireless device is within the coverage area of the mmW cell based on such information as well as GPS (or other GNSS) based location information for the wireless device.

In 504, the wireless device may determine whether to display an indicator of millimeter wave cellular availability, e.g., on a display of the wireless device. The indicator could include an icon, or any of various other possible visual indicators intended to convey that the wireless device is currently able to perform cellular communication in a millimeter wave frequency band (e.g., according to 3GPP 5G NR, via a mmWave cell).

According to some embodiments, this may include determining to display an indicator of millimeter wave cellular availability when connectivity with the 5G NR mmW cell is established as part of the RRC connection. This may further include determining when to cease displaying the indication of 5G NR mmW cell availability after the RRC connection is released or the 5G NR mmW cell is deconfigured based at least in part on the location status information for the wireless device and the motion status information for the wireless device.

For example, the wireless device may determine how likely it is that the wireless device is no longer within the coverage area of the 5G NR mmW cell, and determine to cease displaying the indicator of millimeter wave cellular availability when the likelihood that the wireless device is still within the coverage area of the 5G NR mmW cell falls below a certain threshold. As one possibility, this could include the wireless device determining that a significant location change has occurred (e.g., that anchor cell ID has changed, or that anchor cell signal strength has changed by at least a signal strength change threshold, or that the wireless device is no longer in the geographic area associated with the 5G NR mmW cell), and accordingly determine to cease displaying the indicator of millimeter wave cellular availability.

As another possibility, this could include the wireless device determining that a certain amount of motion has occurred since the RRC connection was released or the 5G NR mmW cell was deconfigured, based on which millimeter wave cellular availability is considered too uncertain to continue displaying the indicator of millimeter wave cellular availability, and accordingly determining to cease displaying the indicator of millimeter wave cellular availability. For example, the wireless device may implement a calculation that depends at least in part on the 5G NR mmW cell signal strength when the RRC connection was released or the 5G NR mmW cell was deconfigured, and also on the amount of time spent on each of the various possible motion states since the RRC connection was released or the 5G NR mmW cell was deconfigured. Once the result of the calculation reaches a certain threshold (e.g., 0, or some other threshold), the wireless device may determine that millimeter wave cellular availability is considered unlikely according to this particular measure.

Note that the wireless device may determine when to cease displaying the indicator of millimeter wave cellular availability based on any of various other possible considerations in addition or alternatively to such location and/or motion related considerations, and/or that location and/or motion based determination of when to cease displaying the indicator of millimeter wave cellular availability may be performed in any of various other ways, according to various embodiments.

At least according to some embodiments, the wireless device may proceed to display an indication of 5G NR mmW cell availability on a display of the wireless device when it is determined to display an indication of 5G NR mmW cell availability, and to cease to display an indication of 5G NR mmW cell availability on the display of the wireless device when it is determined to cease displaying the indication of 5G NR mmW cell availability.

Thus, the method of FIG. 5 may be used to determine whether to display an indicator of millimeter wave cellular availability in a wireless device. At least according to some embodiments, such techniques may help improve user experience, e.g., by providing a more accurate indication of which cellular technology and/or cellular technology features are currently available at the wireless device, at least in some instances.

Figure 6:
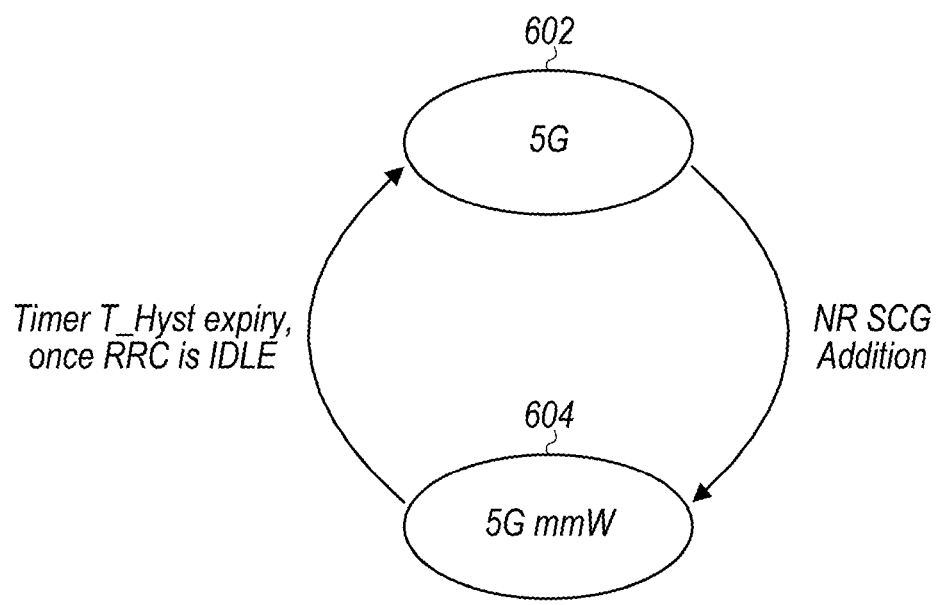
FIGS. 6-8 illustrate further aspects of various possible techniques for determining whether to display an indicator of millimeter wave cellular availability in a wireless device, according to some embodiments.
Figure 7:
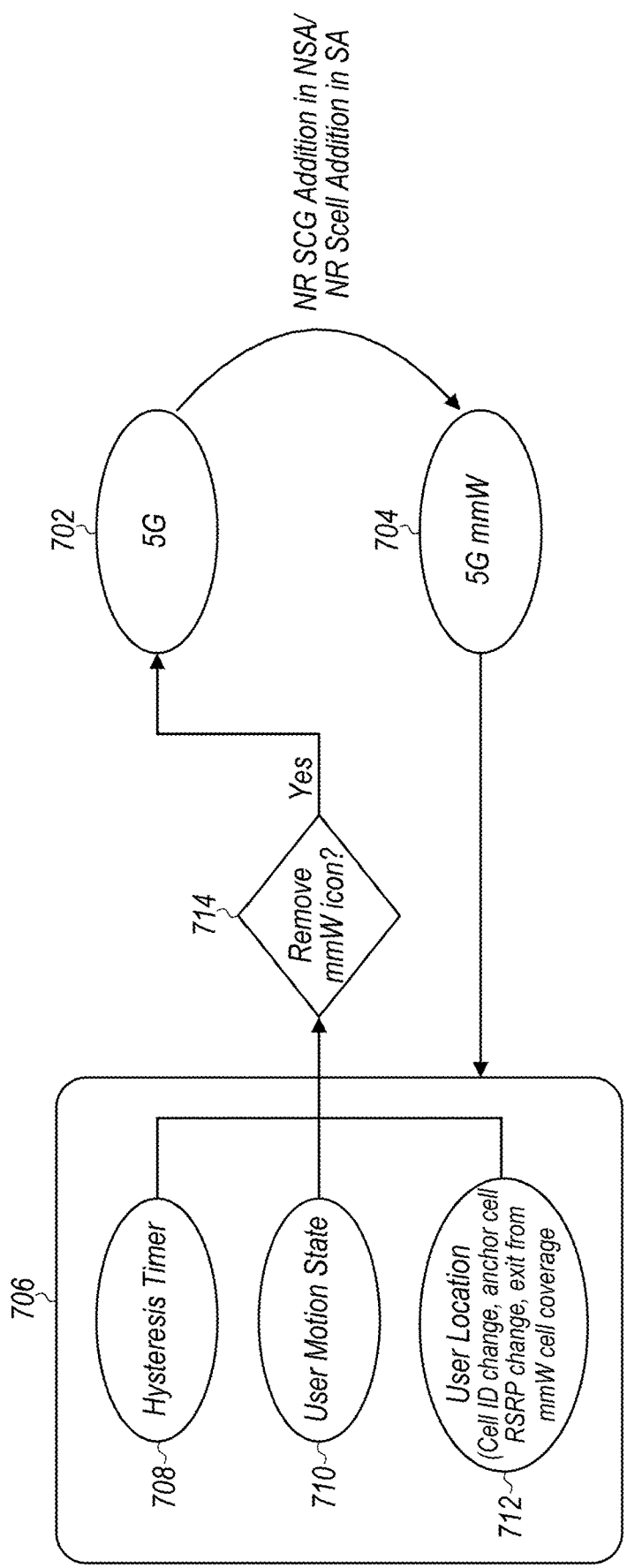
Figure 8:
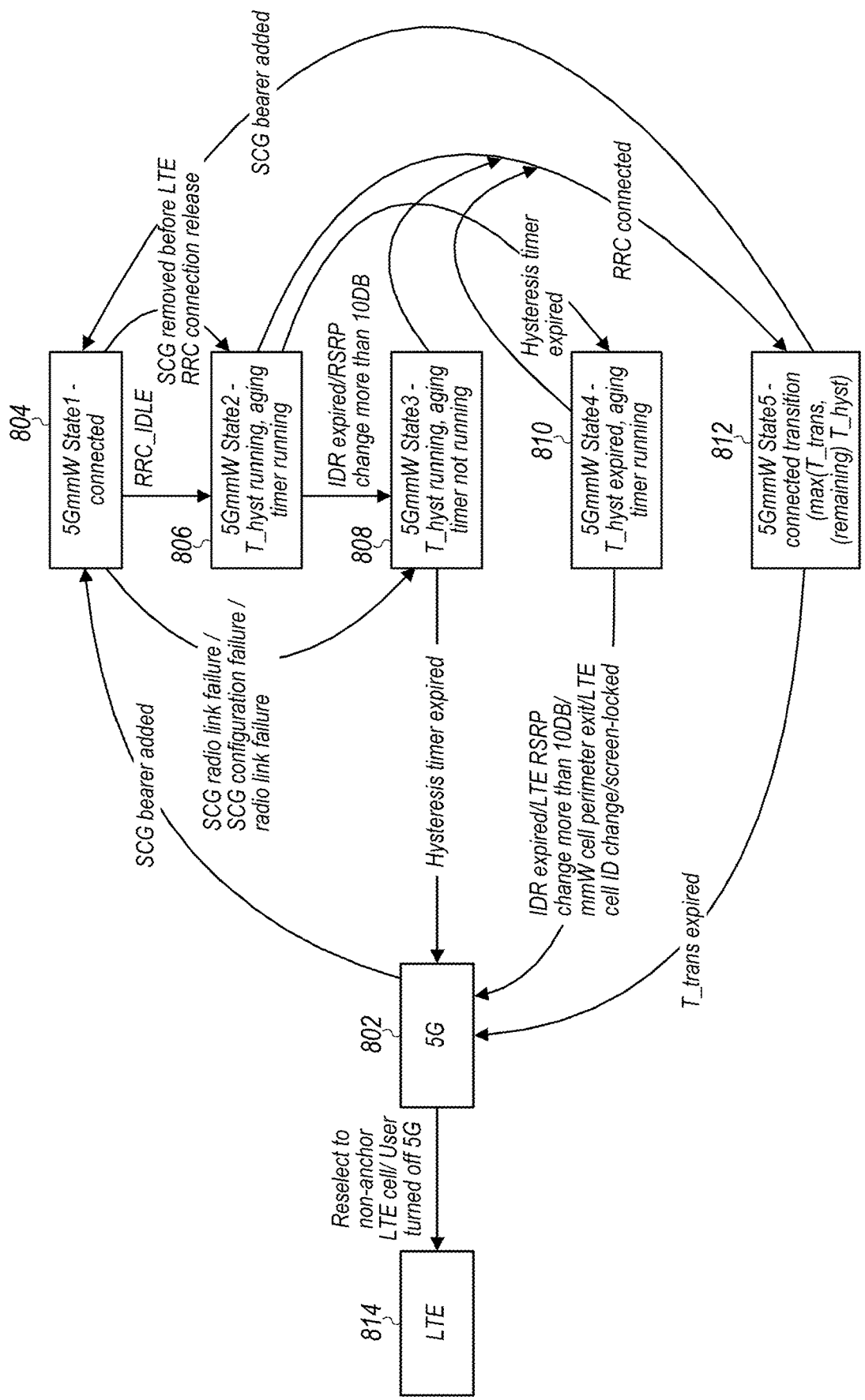

FIGS. 6-8 illustrate further aspects that might be used in conjunction with the method of FIG. 5 if desired. It should be noted, however, that the exemplary details illustrated in and described with respect to FIGS. 6-8 are not intended to be limiting to the disclosure as a whole: numerous variations and alternatives to the details provided herein below are possible and should be considered within the scope of the disclosure.

FIG. 6 illustrates aspects of one possible algorithm for a wireless device with a 5G wireless link to determine when to display an icon indicating 5G mmW communication availability, e.g., in a non-standalone (NSA) 5G NR deployment scenario. As shown, in 602, the wireless device may display an icon indicating 5G communication availability. When a secondary cell group (SCG) with mmWave capability is added (e.g., RRC reconfiguration to add the SCG is performed), in 604, the wireless device may display an icon indicating 5G mmW availability. The icon may persist until the SCG is deconfigured or the wireless device transitions to an RRC idle state. At least in some instances, the icon may further persist for a period of time after such conditions occur, in accordance with a hysteresis timer ("T_Hyst"), e.g., to prevent the icon from flickering between SCG de-configuration and configuration of the next SCG with mmW capability. After expiry of such a hysterisis timer without reconfiguration to add another NR SCG with mmW capability, the wireless device may return to step 602, and may display an icon indicating 5G availability (e.g., and cease displaying an icon indicating 5G mmW availability).

While such an approach may provide an accurate indication of 5G mmW availability in many instances, there may also be scenarios in which such an approach may result in an inaccurate indication of 5G mmW availability or lack of availability. For example, in a scenario in which a wireless device remains stationary after transitioning to RRC idle mode, according to the algorithm of FIG. 6, after expiry of the hysteresis timer, the wireless device may not display an icon indicating 5G mmW availability, even though mmW coverage may still be available. As another example, in a scenario in which a wireless device is moving rapidly (e.g., at vehicular speeds) into and then out of mmW coverage, the wireless device may continue to display an indication of 5G mmW availability for the duration of the hysteresis timer, even though the wireless device may not have 5G mmW coverage available for a significant portion of that duration.

Thus, it may be beneficial to implement an approach to determining when to display an indication of 5G mmW availability that more accurately reflects the actual 5G mmW availability, at least according to some embodiments. Accordingly, FIG. 7 illustrates aspects of such a further possible algorithm for a wireless device with a 5G wireless link to determine when to display an icon indicating 5G mmW communication availability.

As shown, in 702, the wireless device may display an icon indicating 5G communication availability (e.g., "5G", "NR", etc.). When a SCG (e.g., in a NSA deployment) or a secondary cell (SCell) (e.g., in a standalone (SA) 5G NR deployment scenario) with mmWave capability is added, in 704, the wireless device may display an icon indicating 5G mmW availability (e.g., "5G+", "5G UWB", "5G mmW", etc.). In 706, the wireless device may determine various information to use in determining when to remove the icon indicating 5G mmW availability. This information may include a hysteresis timer 708, motion state information 710, and/or location information 712 for the wireless device. In 714, the wireless device may determine whether to remove the icon indicating 5G mmW availability, e.g., based on the determined information. Once it is determined to remove the icon indicating 5G mmW availability, the wireless device may return to step 702, and may display an icon indicating 5G availability (e.g., and cease displaying an icon indicating 5G mmW availability).

The hysteresis timer 708 may be used in a similar manner as described previously herein with respect to FIG. 6, e.g., to prevent the icon from flickering between SCG de-configuration and configuration of the next SCG with mmW capability. The user motion state information 710 and the user location information 712 may additionally or alternatively be used to determine how long to continue displaying an icon indicating 5G mmW availability even after the wireless device transitions to idle mode, e.g., based on the likelihood that 5G mmW availability is still available to the wireless device.

For example, according to some embodiments, an initial set of icon decay rate (IDR) values may be configured based on a time-averaged NR PScell signal strength value when a SCG or SCell providing mmW availability was deconfigured. For example, in a NSA scenario, a time averaged NR PScell RSRP for the SCG may be determined using a certain number of samples beginning from the time the SCG or SCell was configured, and an initial set of IDR values may be determined based at least in part on the time averaged RSRP. The initial IDR value may be selected such that better RSRP results in a larger initial set of IDR values and poorer RSRP results in a smaller initial set of IDR values. The subsequent set of IDR values may be periodically re-calculated based on time-averaged NR PSCell signal strength. At least in some instances, a subsequent decrease in the set of IDR values would reflect moving away from the 5G mmW cell centroid, while an increase would reflect moving towards the 5G mmW cell centroid.

Motion sensor measurements may be used to categorize user motion into one of multiple categories, such as stationary, semi-stationary, moving, or driving, among various possibilities. An IDR set may have values associated with each such motion state. At least in some instances, faster motion states may be associated with higher IDRs, e.g., to reflect that faster motion states may result in the wireless device more quickly moving out of 5G mmW coverage.

The initial IDR value may decay at the IDR associated with the current motion state, and thus the decay rate may change as and when the motion state changes. For example, if a user drives for "X" seconds and stops for "Y" seconds, the decay may be calculated as $X \cdot f(IDR_{Drive}) + Y \cdot f(IDR_{Stationary})$, at least as one possibility. In other words, in this example, to determine the cumulative decay over time, the IDR value decays for X seconds with the decay rate for driving plus Y seconds with the decay rate for stationary. Once the decay value reaches 100 (100% decay), the wireless device may determine to cease displaying an icon indicating 5G mmW availability (e.g., may transition to instead displaying 5G availability).

Note that if desired, to avoid changing IDR due to changes in user motion states overly frequently, a hysteresis timer may be applied between motion states. For example, when the motion state changes (e.g., from driving to stationary, or between any other two motion states), the wireless device may wait a period of time (e.g., a couple of seconds, as one possibility) before applying the decay rate associated with the new motion state, e.g., to ensure that the new motion state is consistent and reliable.

In some instances, the wireless device may also detect when a significant location change occurs, e.g., based on a change of cell ID (e.g., LTE cell ID in the case of a NSA deployment, or NR cell ID in the case of a SA deployment), a change (e.g., decrease) in anchor cell signal strength (e.g., LTE RSRP in the case of a NSA deployment, or NR RSRP in the case of a SA deployment) greater than a signal strength change threshold from the time that the SCG was deconfigured on that cell. As another possibility, the wireless device may be able to detect when the wireless device exits mmW cell coverage based on GPS or other GNSS based location information, e.g., in conjunction with information indicating mmW cell locations (e.g., cell centroid and perimeter), such as could be obtained via crowd-sourced information from mmW capable devices. Such triggers may be used as an alternative or additional possible cause for the IDR value to expire, based at least in part on which the wireless device may determine to cease displaying an icon indicating 5G mmW availability.

FIG. 8 is a state diagram illustrating various states and state transitions that could be used by a wireless device to determine when to display an indication of 5G mmW availability in a NSA deployment scenario, according to some embodiments. Note that at least some aspects of the method of FIG. 8 may also or alternatively be applicable to a SA 5G NR deployment scenario, according to some embodiments.

When attached to a 5G cell (e.g., an anchor cell or a secondary cell), in 802, the wireless device may display an icon indicating 5G availability.

When a SCG bearer with mmW capability is added, the wireless device may transition to a first 5G mmW state 804, in which the wireless device may be in RRC connected mode with a 5G mmW cell configured. The wireless device may display an icon indicating 5G mmW availability while in such a state.

If the wireless device transitions to RRC idle mode or the SCG is removed before LTE RRC connection release, the wireless device may transition to a second 5G mmW state 806, in which the wireless device may also display an icon indicating 5G mmW availability. While in this state, a hysteresis timer T_hyst may be running, as well as an 'aging timer', e.g., in accordance with a determined current set of IDR values.

If the aging timer expires or the anchor cell RSRP changes by more than a certain threshold (e.g., 10 dB, or any other desired threshold) while in the second 5G mmW state, or if SCG radio link failure/SCG configuration failure/radio link failure occurs while in the first 5G mmW state, the wireless device may transition to a third 5G mmW state 808, in which the wireless device may also display an icon indicating 5G mmW availability. While in this state, the hysteresis timer may be running, and the aging timer may not be running. If the hysteresis timer expires while in this state, the wireless device may transition back to the 5G state 802, in which the wireless device may display an icon indicating 5G availability.

If the hysteresis timer expires while the aging timer is still running, the wireless device may transition from the second 5G mmW state 806 to a fourth 5G mmW state 810, in which the wireless device may also display an icon indicating 5G mmW availability. While in this state, the aging timer may be running, and the hysteresis timer may not be running. If the aging timer expires while in this state, or if the anchor cell RSRP changes by more than a certain threshold (e.g., 10 dB, or any other desired threshold), or if a mmW cell perimeter exit is detected, or if an anchor cell ID change occurs, or if the wireless device display is screen-locked, the wireless device may transition back to the 5G state 802, in which the wireless device may display an icon indicating 5G availability.

From any of the second 5G mmW state 806, the third 5G mmW state 808, or the fourth 5G mmW state 810, if the wireless device transitions to RRC connected mode, the wireless device may transition to a fifth 5G mmW state 812, in which the wireless device may also display an icon indicating 5G mmW availability. While in this state, a transition timer ("T_trans") may be running, as well as the hysteresis timer, if it has not yet expired. If the wireless device adds a SCG bearer with mmW capability prior to expiration of the transition timer or the remainder of the hysteresis timer, the wireless device may transition to the first 5G mmW state 804. Otherwise, if the transition timer and the hysteresis timer are both expired, the wireless device may transition back to the 5G state 802, in which the wireless device may display an icon indicating 5G availability.

At least according to some embodiments, it may also be possible for the wireless device to transition from the 5G state 802 to an LTE state 814, in which the wireless device may display an icon indicating LTE availability (e.g., and may not display an icon indicating 5G or 5G mmW availability). Such a transition may occur if the wireless device reselects to a non-anchor LTE cell (e.g., e.g., if NSA 5G NR connectivity is no longer available) or if a user has turned off 5G connectivity, e.g., via a user configuration settings menu, among various possibilities. The wireless device may also be able to transition from the LTE state 814 to the 5G state 802, e.g., upon regaining 5G connectivity.

Several values may be configurable in accordance with use of the state diagram illustrated in FIG. 8, at least according to some embodiments. For example, the duration of T_hyst, the duration of T_trans, the anchor cell RSRP change threshold, the number of anchor cell changes, the IDR for each motion state, the relation of the initial IDR value to mmW cell RSRP, and/or any of various other possible values may be configurable, according to various embodiments. According to some embodiments, either or both of the transition timer and/or the hysteresis timer may be used to reduce or avoid excessive flickering of the icon indicating 5G mmW availability. For example, use of the transition timer may help reduce or avoid flickering in case of a transition from RRC idle (with 5G mmW considered available) to RRC connected without mmW connectivity, e.g., in case a mmW bearer is added within the duration of the timer. Similarly, use of the hysteresis timer may help reduce or avoid flickering in case of transitioning from 5G mmW connected, to SCG deletion, to RRC idle, e.g., in case the SCG removal is followed by addition of another SCG with mmW availability within the duration of the timer.

In the following further exemplary embodiments are provided.

One set of embodiments may include a method, comprising: by a wireless device: establishing a radio resource control (RRC) connection that includes connectivity with a fifth generation (5G) new radio (NR) millimeter wave (mmW) cell; determining to display an indication of 5G NR mmW cell availability based at least in part on the RRC connection that includes connectivity with a 5G NR mmW cell; determining location status information for the wireless device; determining motion status information for the wireless device; and determining when to cease displaying the indication of 5G NR mmW cell availability after the RRC connection is released or the 5G NR mmW cell is deconfigured based at least in part on the location status information for the wireless device and the motion status information for the wireless device.

According to some embodiments, determining the motion status information further comprises: receiving motion sensor information from motion sensing circuitry of the wireless device; and determining a motion state of the wireless device from a plurality of possible motion states based on the motion sensor information.

According to some embodiments, the method further comprises: determining a signal strength of the 5G NR mmW cell upon release of the RRC connection, wherein determining when to cease displaying the indication of 5G NR mmW cell availability after the RRC connection is released is further based at least in part on the signal strength of the 5G NR mmW cell upon release of the RRC connection or deconfiguration of the 5G NR mmW cell.

According to some embodiments, determining location status information for the wireless device further comprises one or more of: determining when an anchor cell ID for the wireless device changes; determining when an anchor cell signal strength changes by more than a configured threshold from when the 5G NR mmW cell is deconfigured; or determining when the wireless device exits a geographic area associated with the 5G NR mmW cell.

According to some embodiments, the method further comprises: displaying an indication of 5G NR mmW cell availability on a display of the wireless device when it is determined to display an indication of 5G NR mmW cell availability; and ceasing to display an indication of 5G NR mmW cell availability on the display of the wireless device when it is determined to cease displaying the indication of 5G NR mmW cell availability.

According to some embodiments, the 5G NR mmW cell is provided in a non-standalone (NSA) 5G deployment.

According to some embodiments, the 5G NR mmW cell is provided in a standalone (SA) 5G deployment.

A further exemplary embodiment may include a method, comprising: performing, by a wireless device, any or all parts of the preceding examples.

Another exemplary embodiment may include a device, comprising: an antenna; a radio coupled to the antenna; and a processing element operably coupled to the radio, wherein the device is configured to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Still another exemplary set of embodiments may include an apparatus comprising a processing element configured to cause a wireless device to perform any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Embodiments of the present disclosure may be realized in any of various forms. For example, in some embodiments, the present subject matter may be realized as a computer-implemented method, a computer-readable memory medium, or a computer system. In other embodiments, the present subject matter may be realized using one or more custom-designed hardware devices such as ASICs. In other embodiments, the present subject matter may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A method, comprising:
  by a wireless device:
    establishing a radio resource control (RRC) connection that includes connectivity with a fifth generation (5G) new radio (NR) millimeter wave (mmW) cell;
    determining to display an indication of 5G NR mmW cell availability based at least in part on the RRC connection that includes connectivity with a 5G NR mmW cell;
    determining location status information for the wireless device;
    determining, based at least in part on motion sensor information received from motion sensing circuitry of the wireless device, motion status information for the wireless device;
    determining, based at least in part on the motion status information, a motion state of the wireless device; and determining when to cease displaying the indication of 5G NR mmW cell availability after the RRC connection is released or the 5G NR mmW cell is deconfigured based at least in part on the location status information for the wireless device and the motion state of the wireless device.

2. The method of claim 1, wherein the method further comprises:
determining a signal strength of the 5G NR mmW cell upon release of the RRC connection or deconfiguration of the 5G NR mmW cell,
wherein determining when to cease displaying the indication of 5G NR mmW cell availability after the RRC connection is released or deconfiguration of the 5G NR mmW cell is further based at least in part on the signal strength of the 5G NR mmW cell upon release of the RRC connection or deconfiguration of the 5G NR mmW cell.

3. The method of claim 1, wherein determining location status information for the wireless device further comprises one or more of:
determining when an anchor cell ID for the wireless device changes;
determining when an anchor cell signal strength changes by more than a configured threshold from when the 5G NR mmW cell is deconfigured; or
determining when the wireless device exits a geographic area associated with the 5G NR mmW cell.

4. The method of claim 1, wherein the method further comprises:
displaying an indication of 5G NR mmW cell availability on a display of the wireless device when it is determined to display an indication of 5G NR mmW cell availability; and
ceasing to display an indication of 5G NR mmW cell availability on the display of the wireless device when it is determined to cease displaying the indication of 5G NR mmW cell availability.

5. The method of claim 1,
wherein the 5G NR mmW cell is provided in a non-standalone (NSA) 5G deployment.

6. The method of claim 1,
wherein the 5G NR mmW cell is provided in a standalone (SA) 5G deployment.

7. An apparatus, comprising:
a processor configured to cause a wireless device to:
establish a radio resource control (RRC) connection that includes connectivity with a fifth generation (5G) new radio (NR) millimeter wave (mmW) cell;
determine to provide an indication of 5G NR mmW cell availability based at least in part on the RRC connection that includes connectivity with a 5G NR mmW cell;
determine, based at least in part on motion sensor information received from motion sensing circuitry of the wireless device, motion status information for the wireless device;
determine, based at least in part on the motion status information, a motion state of the wireless device;
determine that the wireless device is no longer connected with the 5G NR mmW cell; and
determine when to cease providing the indication of 5G NR mmW cell availability after the wireless device is no longer connected with the 5G NR mmW cell based at least in part on location status information or the motion state of the wireless device.

8. The apparatus of claim 7, wherein the processor is further configured to cause the wireless device to:
determine a signal strength of the 5G NR mmW cell,
wherein when to cease providing the indication of 5G NR mmW cell availability after the wireless device is no longer connected with the 5G NR mmW cell is determined based at least in part on the signal strength of the 5G NR mmW cell.

9. The apparatus of claim 7, wherein the processor is further configured to cause the wireless device to:
determine that an anchor cell ID for the wireless device has changed; and
determine to cease providing the indication of 5G NR mmW cell availability after the wireless device is no longer connected with the 5G NR mmW cell based at least in part on the anchor cell ID for the wireless device having changed.

10. The apparatus of claim 7, wherein the processor is further configured to cause the wireless device to:
determine that an anchor cell signal strength has decreased by more than a configured threshold after the wireless device is no longer connected with the 5G NR mmW cell; and
determine to cease providing the indication of 5G NR mmW cell availability after the wireless device is no longer connected with the 5G NR mmW cell based at least in part on the anchor cell signal strength having decreased by more than the configured threshold after the wireless device is no longer connected with the 5G NR mmW cell.

11. The apparatus of claim 7, wherein the processor is further configured to cause the wireless device to:
determine that the wireless device has exited a geographic area associated with the 5G NR mmW cell; and
determine to cease providing the indication of 5G NR mmW cell availability after the wireless device is no longer connected with the 5G NR mmW cell based at least in part on the wireless device having exited the geographic area associated with the 5G NR mmW cell.

12. A wireless device, comprising:
an antenna;
a radio operably coupled to the antenna; and
a processor operably coupled to the radio;
wherein the wireless device is configured to:
establish a wireless link with a fifth generation (5G) new radio (NR) millimeter wave (mmW) cell;
provide an indication of 5G NR mmW cell availability via a user interface element of the wireless device based at least in part on the wireless link with the 5G NR mmW cell;
determine, based at least in part on motion sensor information received from motion sensing circuitry of the wireless device, motion status information for the wireless device;
determine, based at least in part on the motion status information, a motion state of the wireless device;
determine that the wireless link with the 5G NR mmW cell is released; and
cease to provide the indication of 5G NR mmW cell availability via the user interface element of the wireless device after the wireless link with the 5G NR mmW cell is released, wherein when to cease providing the indication of 5G NR mmW cell availability is determined based at least in part on one or more of location status information or the motion state of the wireless device.

13. The wireless device of claim 12, wherein the wireless device is configured to:
- determine a signal strength of the wireless link with the 5G NR mmW cell,
- determine an indicator decay rate for the indication of 5G NR mmW cell availability based at least in part on the signal strength of the wireless link with the 5G NR mmW cell and the motion status information for the wireless device; and
- determine to cease providing the indication of 5G NR mmW cell availability based at least in part on an indicator decay value reaching a configured threshold, wherein the indicator decay value is calculated based at least in part on the indicator decay rate and an amount of time that has passed since the wireless link with the 5G NR mmW cell is released.

14. The wireless device of claim 12, wherein wireless link with the 5G NR mmW cell is a secondary cell link, wherein the wireless device is configured to:
- determine that an anchor cell ID for the wireless device has changed; and
- determine to cease providing the indication of 5G NR mmW cell availability after the wireless link with the 5G NR mmW cell is released based at least in part on the anchor cell ID for the wireless device having changed.

15. The wireless device of claim 12, wherein wireless link with the 5G NR mmW cell is a secondary cell link, wherein the wireless device is configured to:
- determine that an anchor cell signal strength has decreased by more than a configured threshold after the wireless link with the 5G NR mmW cell is released; and
- determine to cease providing the indication of 5G NR mmW cell availability after the wireless link with the 5G NR mmW cell is released based at least in part on the anchor cell signal strength having decreased by more than the configured threshold after the wireless link with the 5G NR mmW cell is released.

16. The wireless device of claim 12, wherein the wireless device is configured to:
- determine that the wireless device has exited a geographic area associated with the 5G NR mmW cell based at least in part on global navigational satellite system (GNSS) based location information for the wireless device and information indicating geographical boundaries for the 5G NR mmW cell; and
- determine to cease providing the indication of 5G NR mmW cell availability after the wireless link with the 5G NR mmW cell is released based at least in part on the wireless device having exited the geographic area associated with the 5G NR mmW cell.

17. The wireless device of claim 12, wherein the user interface element of the wireless device includes a display of the wireless device, wherein the indication of 5G NR mmW cell availability includes an icon displayed on the display of the wireless device.

18. The wireless device of claim 12, wherein the 5G NR mmW cell is provided in a non-standalone (NSA) 5G deployment.

19. The wireless device of claim 12, wherein the 5G NR mmW cell is provided in a standalone (SA) 5G deployment.

20. The wireless device of claim 12, wherein the motion state is associated with at least one of a stationary state, a semi-stationary state, a moving state, or a driving state.

* * * * *